United States Patent
Kao et al.

(10) Patent No.: US 8,527,234 B2
(45) Date of Patent: Sep. 3, 2013

(54) LOCATING APPARATUS, LOCATING METHOD AND COMPUTER PROGRAM STORAGE PRODUCT THEREOF FOR A MOBILE DEVICE

(75) Inventors: Wei-Wen Kao, Taoyuan (TW);
Chih-Horng Li, Ji-an Township (TW);
Augustine Tsai, Taipei (TW)

(73) Assignee: Institute for Information Industry, Taipei (TW)

( * ) Notice: Subject to any disclaimer, the term of this patent is extended or adjusted under 35 U.S.C. 154(b) by 393 days.

(21) Appl. No.: 12/629,870

(22) Filed: Dec. 2, 2009

(65) Prior Publication Data

US 2011/0125453 A1    May 26, 2011

(30) Foreign Application Priority Data

Nov. 24, 2009   (TW) ................................ 98139889 A (51) Int. Cl.
  *G06F 15/00*   (2006.01)
  *G01P 15/00*   (2006.01)
(52) U.S. Cl.
  USPC .......................................... 702/150; 702/141
(58) Field of Classification Search
  USPC ................. 702/141, 150–153; 701/213, 216, 701/472
  See application file for complete search history.

(56) References Cited

U.S. PATENT DOCUMENTS

| 7,505,865 | B2 | 3/2009 | Ohkubo et al. |
| 2002/0180166 | A1 | 12/2002 | Voss |
| 2006/0265127 | A1 | 11/2006 | Qu |
| 2007/0067096 | A1 | 3/2007 | Ohkubo et al. |
| 2008/0071475 | A1 | 3/2008 | Takaoka |
| 2008/0272560 | A1 | 11/2008 | Voss |
| 2009/0018772 | A1* | 1/2009 | Watanabe et al. ............. 701/214 |

FOREIGN PATENT DOCUMENTS

| CN | 1405530 A | 3/2003 |
| CN | 1561296 A | 1/2005 |
| CN | 1928567 A | 3/2007 |
| CN | 1928568 A | 3/2007 |
| EP | 1760475 A2 | 3/2007 |
| WO | WO 2009/132682 A1 | 11/2009 |

OTHER PUBLICATIONS

Hong et al. ("SenseCoding: Accelerometer-Assisted Motion Estimationi for Efficient Video Encoding.") 2008.*
May 30, 2012 Search Report in the Netherlands for the Netherlands counterpart application (App. No. 2005198) to the instant US Application, 8 pages.
English translation of the May 30, 2012 Search Report in the Netherlands for the Netherlands counterpart application (App. No. 2005198) to the instant US Application, 6 pages.
Office Action by the Chinese patent office (SIPO) for the Chinese counterpart application to the present US application, Nov. 29, 2012, 14 pages.

* cited by examiner

*Primary Examiner* — Sujoy Kundu
(74) *Attorney, Agent, or Firm* — Skaar Ulbrich Macari, P.A.

(57) ABSTRACT

A locating apparatus, a locating method and a computer program storage product thereof for a mobile device are provided. The mobile device has an initial speed. The locating apparatus comprises a sensing unit, a calculation unit and a processing unit. The sensing unit is configured to sense acceleration information and height displacement information. The calculation unit is configured to calculate angle information according to the initial speed, the acceleration information, the height displacement information and a predetermined time interval, is configured to calculate modified acceleration information according to the acceleration information and the angle information, and is configured to calculate composite displacement information according to the initial speed, the modified acceleration information and the predetermined time interval, so that the processing unit is able to generate more accurate location information according to the composite displacement information and the height displacement information.

15 Claims, 6 Drawing Sheets

LOCATING APPARATUS, LOCATING METHOD AND COMPUTER PROGRAM STORAGE PRODUCT THEREOF FOR A MOBILE DEVICE

PRIORITY

This application claims the benefit from the priority to Taiwan Patent Application No. 098139889 filed on Nov. 24, 2009, the disclosure of which are incorporated by reference herein in their entirety.

FIELD

The present invention relates to a locating apparatus, a locating method and a computer program storage product thereof for a mobile device. More particularly, the present invention relates to a locating apparatus, a locating method and a computer program storage product thereof capable of acquiring location information of a mobile device without the support of the Global Positioning System (GPS).

BACKGROUND

The Global Positioning System (GPS) is a medium-range circular-orbit satellite system, it provides accurate locating services for most of areas on the Earth. GPS was originally developed for military purposes. GPS is currently available to civilians and has brought about revolutionary changes in daily life. For example, through signals provided by GPS and an e-map provided by a locating/navigating device, vehicle drivers are able to locate their own positions, to know where they are and to enjoy the navigation function.

However, since a vehicle is an object that may move at any time, GPS signals are likely to be attenuated or shielded as the vehicle passing by a building, through a tunnel or to be sheltered by the terrain. If the locating/navigation apparatus disposed on the vehicle fails to receive the GPS signals, it will fail to locate and to provide the current vehicle location, so that the locating/navigation apparatus can not provide the navigation function.

To continuously indicate the current vehicle location as driving in an area that the locating/navigation apparatus can not receive GPS signals, a sensing unit for sensing a plurality of parameters has been provided in the prior art to solve such a problem. More specifically, according to the parameters sensed by the sensing unit (e.g., an accelerometer and/or a gyroscope), the locating/navigation apparatus can estimate the current vehicle location by employing a dead reckoning approach from a previous location obtained before failure of the locating/navigation apparatus to receive GPS signals. In this way, the locating/navigation apparatus can keep presenting the current vehicle location even when it fails to receive GPS signals.

Unfortunately, the location accuracy of the locating/navigation apparatus may decline because these parameters sensed by the sensing unit are affected by various factors. For example, when the vehicle is driving on an uphill or downhill road, the parameters sensed by the sensing unit are erroneous due to influence of the gravity. Besides, the dead reckoning approach adopted by the locating/navigation apparatus is only able to estimate locations of the vehicle in a plane. However, there are transportation network formed of planar roads and elevated roads in modern cities, employing the dead reckoning approach will cause significant degradation in location accuracy of the locating/navigation apparatus.

In view of this, there remains a continuing need to provide locating/navigation apparatus with a more accurate locating method that can inform users of their current location even when GPS signals are not available.

SUMMARY

An objective of particular embodiments of the present invention is to provide a locating apparatus for a mobile device with an initial speed. The locating apparatus comprises a storage unit, a sensing unit, a calculation unit and a processing unit. The storage unit is configured to store the initial speed as initial speed information. The sensing unit is configured to sense acceleration information and height displacement information. The calculation unit is configured to calculate angle information according to the initial speed information, the acceleration information, the height displacement information and a predetermined time interval, to calculate modified acceleration information according to the acceleration information and the angle information, and to calculate composite displacement information according to the initial speed information, the modified acceleration information and the predetermined time interval. The processing unit is configured to generate location information according to the composite displacement information and the height displacement information.

Another objective of particular embodiments of the present invention is to provide a locating method for a mobile device with initial speed. The locating method comprises the steps of: enabling a storage unit to store the initial speed as initial speed information; enabling a sensing unit to sense acceleration information and height displacement information; enabling a calculation unit to calculate angle information according to the initial speed information, the acceleration information, the height displacement information and a predetermined time interval; enabling the calculation unit to calculate modified acceleration information according to the acceleration information and the angle information; enabling the calculation unit to calculate composite displacement information according to the initial speed information, the modified acceleration information and the predetermined time interval; and enabling a processing unit to generate location information according to the composite displacement information and the height displacement information.

To accomplish the aforesaid objectives, certain embodiments of the present invention further provide a computer program storage product comprising a tangible machine-readable medium which has executable codes to perform the aforesaid locating method for a mobile device. When the executable codes are loaded into the locating apparatus via a computer and executed, the aforesaid locating method can be accomplished.

The locating apparatus, the locating method and the computer program storage product thereof according to the present invention can calculate angle information according to the initial speed information, the acceleration information and the height displacement information sensed by the sensing unit as well as the predetermined time interval, and modifies the acceleration information according to the angle information. Thereby, the present invention can not only locate an object in a three-dimensional (3D) environment even when no GPS signal is received, but also improve the locating accuracy.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the present invention will be explained with reference to embodiments thereof. The present invention relates to a locating apparatus, a locating method and a computer program storage product thereof. The locating apparatus may be an apparatus capable of receiving GPS signals, such as a smart mobile phone, a personal digital assistant (PDA) or a netbook. The mobile device may be a device that is movable, such as a vehicle, a ship or an aircraft. However, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Hereinafter, a locating apparatus 11 for a mobile device 10 of a first embodiment in accordance with the present invention will be described with reference to schematic views depicted in FIGS. 1A to 1D. The locating apparatus 11 is configured to calculate location information of the mobile device 10 at a location k, and the locating apparatus 11 is disposed in the mobile device 10.

Figure 1A:
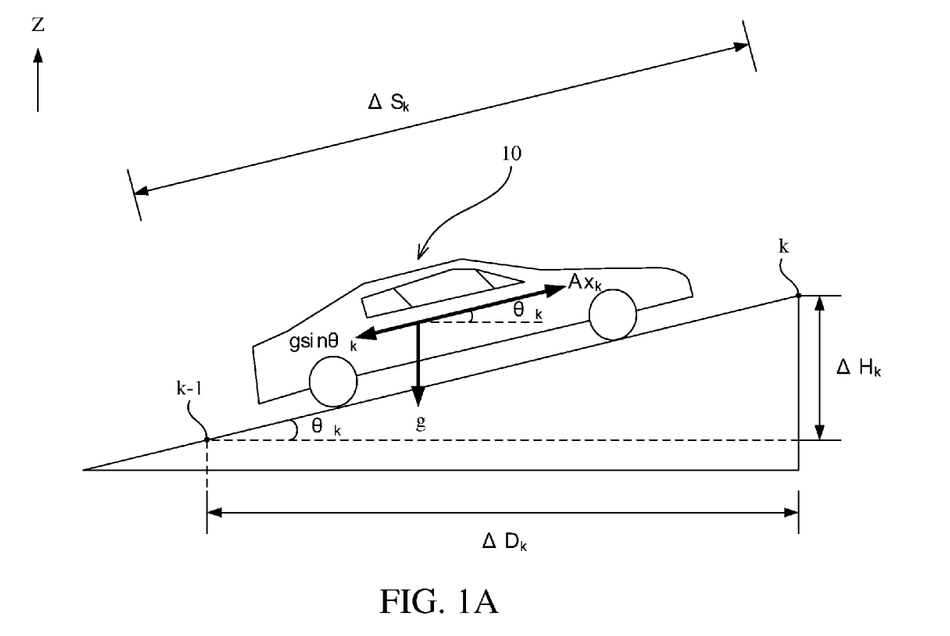
FIGS. 1A-1D are schematic diagrams illustrating a first embodiment of the present invention.
Figure 1B:
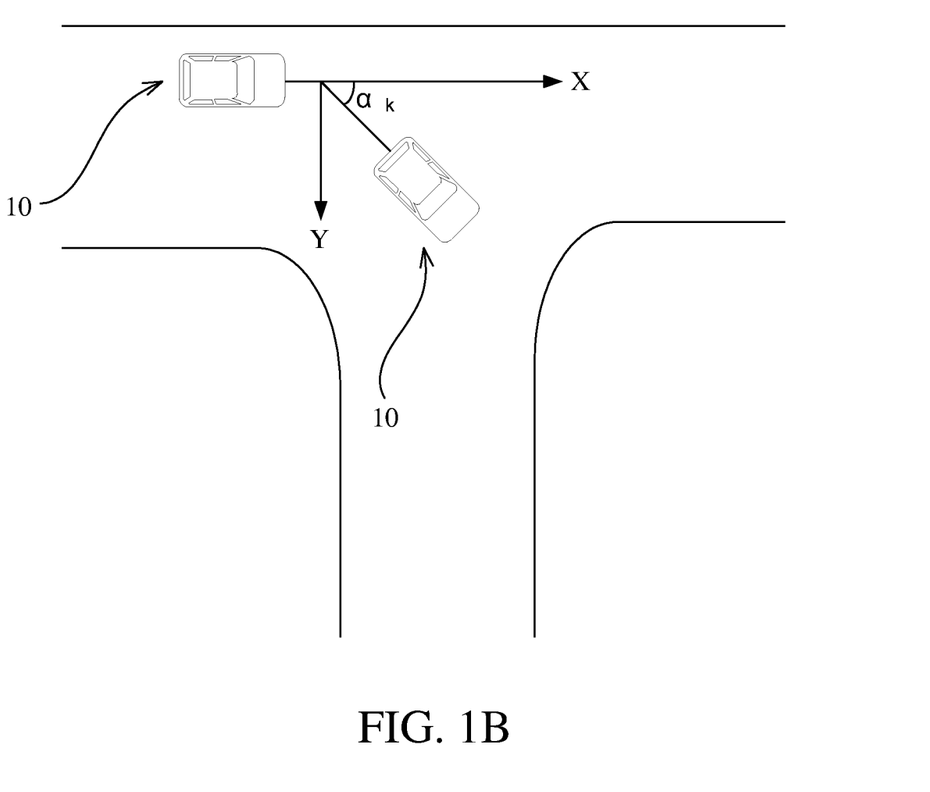
Figure 1C:
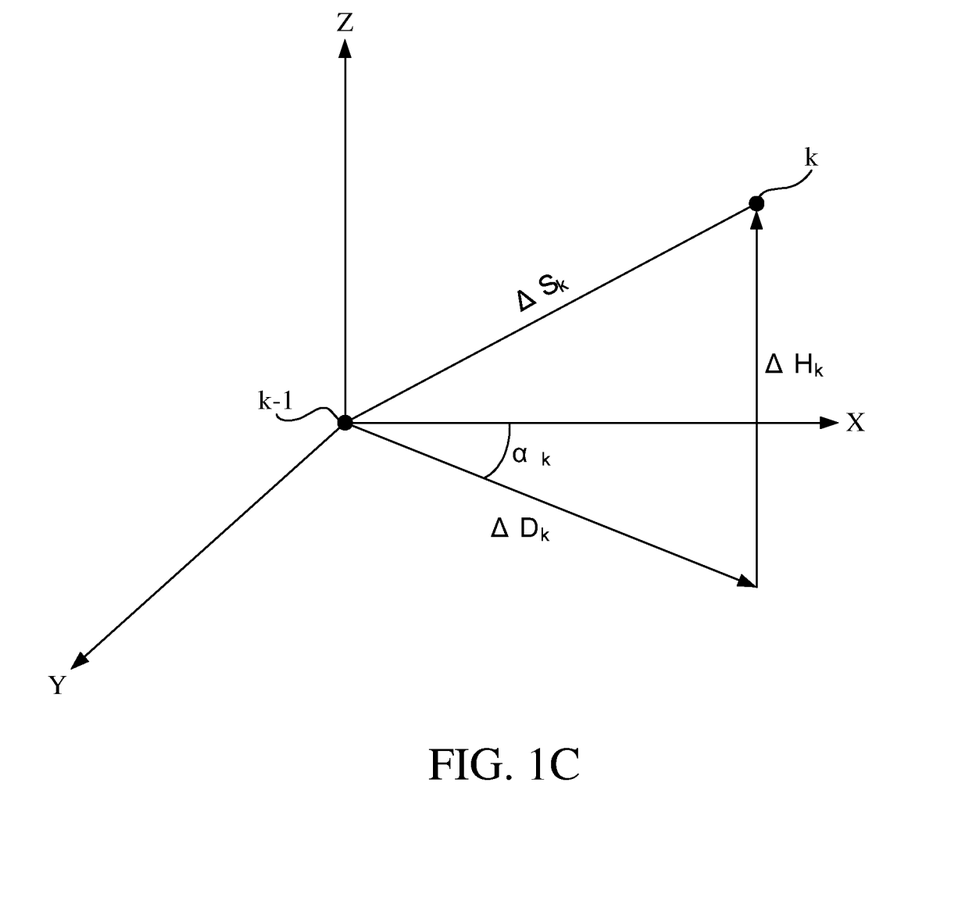

Specifically, FIGS. 1A-1C are schematic diagrams showing the mobile device 10 moving from a location k−1 to the location k within a predetermined time interval (not shown). The location k−1 has a 3D coordinate of $(x_{k-1}, y_{k-1}, z_{k-1})$, and the 3D coordinate of the location k is $(x_k, y_k, z_k)$. In FIG. 1A, $\theta_k$ represents an angle, wherein the angle is formed by the mobile device 10 moving from the coordinate $(z_{k-1})$ to the coordinate $(z_k)$ along the Z direction within the predetermined time interval, g represents the gravitational acceleration, $g \sin \theta_k$ represents a component of the gravitational acceleration, $Ax_k$ represents an acceleration of the mobile device 10 moving from the location k−1 to the location k, $\Delta S_k$ represents a composite displacement of the mobile device 10 moving from the location k−1 to the location k, and $\Delta D_k$ and $\Delta H_k$ represent a horizontal displacement and a height displacement of the mobile device 10 moving from the location k−1 to the location k respectively. The mobile device 10 has an initial speed (not shown) at the location k−1.

In FIG. 1B, $\alpha_k$ represents a cornering angle of the mobile device 10 when cornering (from the X direction to the Y direction) from the coordinates $(x_{k-1}, y_{k-1})$ to the coordinates $(x_k, y_k)$ within the predetermined time interval. FIG. 1C is a schematic 3D coordinate diagram showing the movement of the mobile device 10 from the location k−1 to the location k.

Figure 1D:
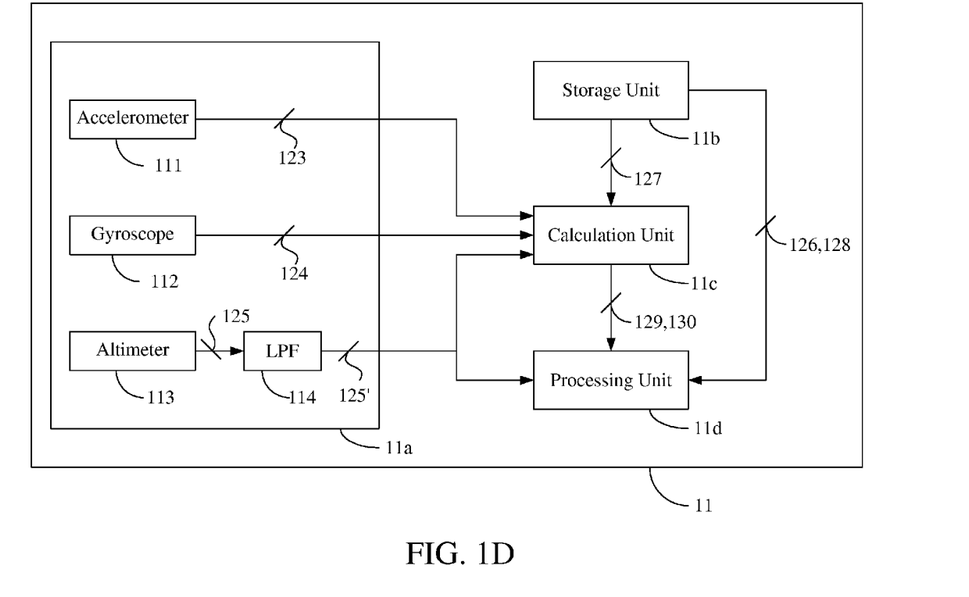

As shown in FIG. 1D, the locating apparatus 11 of the first example embodiment of the present invention comprises a sensing unit 11a, a storage unit 11b, a calculation unit 11c and a processing unit 11d. The sensing unit 11a further comprises an accelerometer 111, a gyroscope 112, an altimeter 113 and a low-pass filter (LPF) 114. The storage unit 11b is configured to store map information 126. In this embodiment, when the mobile device 10 is located at the location k−1, an initial speed and the 3D location coordinate $(x_{k-1}, y_{k-1}, z_{k-1})$ are still calculated according to GPS signals, and are stored in real time by the storage unit 11b as initial speed information 127 and initial location information 128.

When the mobile device 10 moves to the location k, the accelerometer 111 senses an acceleration of the mobile device 10 to generate acceleration information 123. The gyroscope 112 is configured to sense a cornering angular speed of the mobile device 10 to generate cornering angular speed information 124. The altimeter 113 is configured to sense a height displacement of the mobile device 10 to generate height displacement information 125.

It should be noted that the altimeter 113 described in this embodiment senses the height displacement of the mobile device 10 according to variations in the atmospheric pressure and generates the height displacement information 125. In case the atmospheric pressure varies abruptly within a short time, accuracy of the height displacement information 125 will degrade. Therefore, in order to improve accuracy of the height displacement information 125 generated by the altimeter 113, the LPF 114 processes the height displacement information 125 to generate modified height displacement information 125'. It should be appreciated herein that, the present invention is not limited to improving accuracy of the height displacement information 125 by the LPF 114; the accuracy of the height displacement information 125 may also be improved in other manners by those of ordinary skill in the art depending on practical needs, and this will not be further described herein.

Also, the present invention is not limited to sense the acceleration, the cornering angular speed and the height displacement of the mobile device 10 by the accelerometer 111, the gyroscope 112 and the altimeter 113 respectively; those of ordinary skill in the art may use other measuring instrument to sense the acceleration, the cornering angular speed and the height displacement depending on practical needs, and this will not be further described herein.

Thereafter, the calculation unit 11c calculates temporary displacement information according to the initial speed information 127, the acceleration information 123 and the aforesaid predetermined time interval through Equation (1):

$$\overline{\Delta s_k} = V_{k-1}\Delta T + (Ax_k \Delta T^2)/2 \qquad (1)$$

$V_{k-1}$ represents the initial speed information 127 (i.e., the initial speed of the mobile device 10 at the location k−1), $\Delta T$ represents the predetermined time interval, $Ax_k$ represents the acceleration information 123 (i.e., the acceleration of the mobile device 10 moving from the location k−1 to the location k), and $\overline{\Delta s_k}$ represents the temporary displacement information.

After calculating and generating the temporary displacement information according to the initial speed information 127, the acceleration information 123 and the aforesaid predetermined time interval, the calculation unit 11c calculates angle information according to Equation (2):

$$\theta_k = \sin^{-1}(\Delta H_k / \Delta s_k) \quad (2)$$

$\Delta s_k$ represents the temporary displacement information, $\Delta H_k$ represents the height displacement information 125' (i.e., the height displacement of the mobile device 10 moving from the location k−1 to the location k), and $\theta_k$ represents the angle information (i.e., the angle formed by the mobile device 10 moving from the coordinate ($z_{k-1}$) to the coordinate ($z_k$) along the Z direction within the predetermined time interval).

Then, according to the acceleration information 123 and the angle information, the calculation unit 11c calculates modified acceleration information through Equation (3):

$$ax_k = Ax_k - g \sin \theta_k \quad (3)$$

$Ax_k$ represents the acceleration information 123 (i.e., the acceleration of the mobile device 10 moving from the location k−1 to the location k), g represents the gravitational acceleration, $\theta_k$ represents the angle information (i.e., the angle formed by the mobile device 10 moving from the coordinate ($z_{k-1}$) to the coordinate ($z_k$) along the Z direction within the predetermined time interval), and $ax_k$ represents the modified acceleration information.

Similarly, according to the cornering angular speed information 124 and the angle information, the calculation unit 11c calculates modified cornering angular speed information through Equation (4):

$$\omega'_k = \omega_k / \cos \theta_k \quad (4)$$

$\omega_k$ represents the cornering angular speed information 124 (i.e., the cornering angular speed of the mobile device 10 sensed by the gyroscope 112), $\theta_k$ represents the angle information (i.e., the angle formed by the mobile device 10 moving from the coordinate ($z_{k-1}$) to the coordinate ($z_k$) along the Z direction within the predetermined time interval), and $\omega'_k$ represents the modified cornering angular speed information.

Next, according to the initial speed information 127, the modified acceleration information calculated through Equation (3) and the predetermined time interval, the calculation unit 11c calculates composite displacement information through Equation (5):

$$\Delta S_k = V_{k-1} \Delta T + ax_k \Delta T^2 / 2 \quad (5)$$

$V_{k-1}$ represents the initial speed information 127 (i.e., the initial speed of the mobile device 10 at the location k−1), $\Delta T$ represents the predetermined time interval, $ax_k$ represents the modified acceleration information, and $\Delta S_k$ represents the composite displacement information (i.e., the composite displacement of the mobile device 10 moving from the location k−1 to the location k).

According to the angle information and the composite displacement information, the calculation unit 11c calculates horizontal displacement information 129 through Equation (6):

$$\Delta D_k = \Delta S_k \cos \theta_k \quad (6)$$

$\Delta S_k$ represents the composite displacement information (i.e., the composite displacement of the mobile device 10 moving from the location k−1 to the location k), $\theta_k$ represents the angle information (i.e., the angle formed by the mobile device 10 moving from the coordinate ($z_{k-1}$) to the coordinate ($z_k$) along the Z direction within the predetermined time interval), and $\Delta D_k$ represents the horizontal displacement information 129 (i.e., the horizontal displacement of the mobile device 10 moving from the location k−1 to the location k).

Furthermore, according to the modified cornering angular speed information and the predetermined time interval, the calculation unit 11c calculates cornering angle information 130 through Equation (7):

$$\alpha_k = \omega'_k \Delta T \quad (7)$$

$\omega'_k$ represents the modified cornering angular speed information, $\Delta T$ represents the predetermined time interval, and $\alpha_k$ represents the cornering angle information 130.

The processing unit 11d receives the height displacement information 125, the map information 126, the initial location information 128 (i.e. the 3D location coordinate ($x_{k-1}$, $y_{k-1}$, $z_{k-1}$) of the mobile device 10 at the location k−1), the horizontal displacement information 129 and the cornering angle information 130. Then according to the initial location information 128, the horizontal displacement information 129 and the cornering angle information 130, the processing unit 11d calculates two-dimensional (2D) coordinate information through Equation (8):

$$(x_k, y_k) = (x_{k-1} + \Delta D_k \cos \alpha_k, y_{k-1} + \Delta D_k \sin \alpha_k) \quad (8)$$

($x_{k-1}$, $y_{k-1}$) represents the 2D location coordinate of the mobile device 10 at the location k−1, $\Delta D_k$ represents the horizontal displacement information 129 (i.e., the horizontal displacement of the mobile device 10 moving from the location k−1 to the location k), $\alpha_k$ represents the cornering angle information 130, and ($x_k$, $y_k$) represents the 2D location coordinate of the mobile device 10 at the location k.

Next, the processing unit 11d generates the location information (not shown) according to the 2D coordinate information and the height displacement information 125', and labels a horizontal location and an altitude location (i.e., the 3D location coordinate ($x_k$, $y_k$, $z_k$)) of the mobile device 10 at the location k in the map information 126 according to the location information.

Figure 2A:
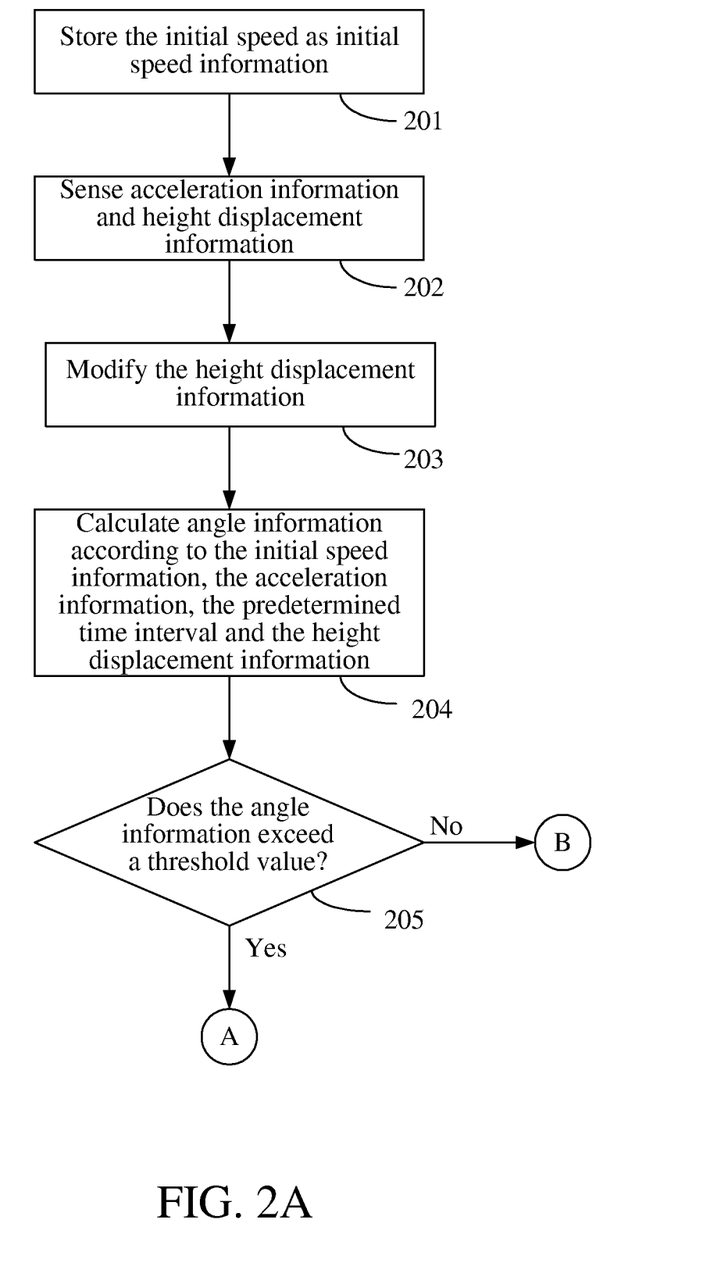
FIGS. 2A-2B are flowcharts of a second embodiment of the present invention.
Figure 2B:
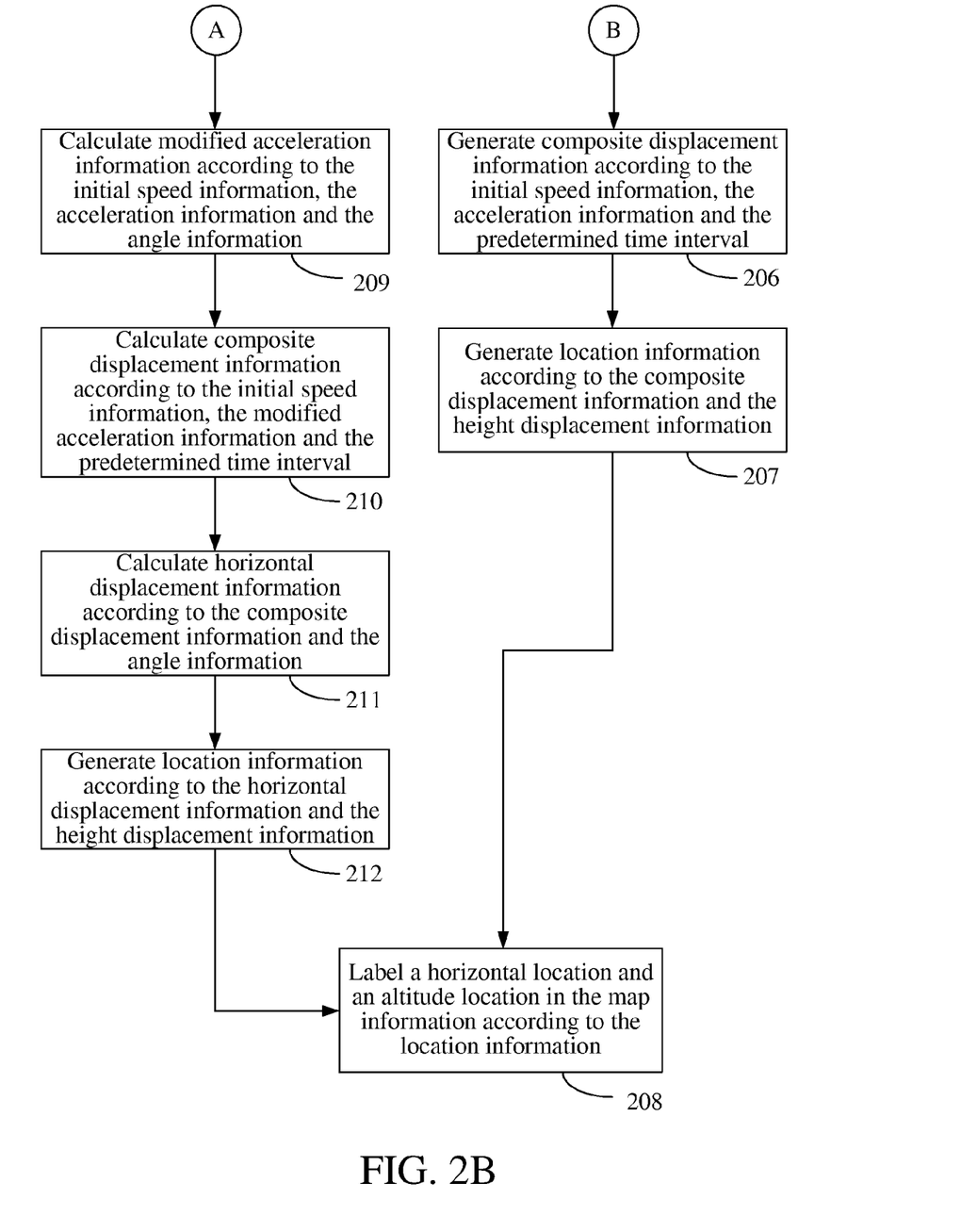

FIGS. 2A-2B show a second embodiment of the present invention, which is a locating method for a mobile device, e.g., the mobile device 10 described in the first embodiment. The locating method of the present invention may be used in a locating apparatus, e.g., the locating apparatus 11 described in the first embodiment. The mobile device has an initial speed. The locating apparatus comprises a sensing unit, a storage unit, a calculation unit and a processing unit. Map information is stored in the storage unit of the locating apparatus.

In particular, the locating method of the second embodiment may be implemented by a computer program storage product comprising a tangible machine-readable medium. When a plurality of executable codes stored in the tangible machine-readable medium are loaded into the locating apparatus via a computer, the executable codes are executed to accomplish the locating method of the present invention. These executable codes may be stored in the tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Firstly, step 201 is executed to enable the storage unit to store the initial speed as initial speed information, and the sensing unit senses acceleration information and height displacement information in step 202. Then, the sensing unit further modifies the height displacement information in step 203.

Next, the calculation unit calculates angle information according to the initial speed information, the acceleration information, the predetermined time interval and the height displacement information in step 204. More specifically, the calculation unit calculates temporary displacement information according to the initial speed information, the acceleration information and the predetermined time interval, and then calculates the angle information according to the temporary displacement information and the height displacement information.

Afterwards, step 205 is executed to enable the processing unit to determine whether the angle information exceeds a threshold value. If not, it means that the mobile device is driving on a planar road, so it is unnecessary to modify the acceleration information. Then, the calculation unit generates composite displacement information according to the initial speed information, the acceleration information and the predetermined time interval in step 206, the processing unit generates location information according to the composite displacement information and the height displacement information in step 207. Finally, step 208 is executed to enable the processing unit to label a horizontal location and an altitude location in the map information according to the location information.

If in step 207, the processing unit determines that the angle information exceeds the threshold value, it means that the mobile device is driving on a non-planar road, the acceleration information must be modified. Then, step 209 is executed to enable the calculation unit to calculate modified acceleration information according to the initial speed information, the acceleration information and the angle information, the calculation unit calculates composite displacement information according to the initial speed information, the modified acceleration information and the predetermined time interval in step 210. Afterwards, step 211 is executed to enable the calculation unit to calculate horizontal displacement information according to the composite displacement information and the angle information, and the processing unit generates the location information according to the horizontal displacement information and the height displacement information in step 212. Finally, step 208 is executed to enable the processing unit to label a horizontal location and an altitude location in the map information according to the location information.

In addition to the aforesaid steps, the locating method of the present invention can also execute all the operations and functions set forth in the first embodiment. How the locating method of the present invention executes these operations and functions will be readily appreciated by those of ordinary skill in the art based on the explanation of the first embodiment, and thus will not be further described herein.

In summary, the locating apparatus, the locating method and the computer program storage product thereof according to certain embodiments of the present invention can calculate angle information according to the initial speed information, the acceleration information and the height displacement information sensed by the sensing unit as well as the predetermined time interval, and modify the acceleration information according to the angle information. Therefore, locating an object in a 3D environment can be accomplished accurately and timely without the support of GPS signals by the locating apparatus, the locating method and the computer program storage product thereof according to the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A locating method for a mobile device with an initial speed, the locating method comprising the following steps of:
enabling a storage unit to store the initial speed as initial speed information;
enabling a sensing unit to sense acceleration information and height displacement information, wherein the height displacement information is sensed by an altimeter of the sensing unit;
enabling a low-pass filter (LPF) to adjust the height displacement information to reduce abrupt variations in atmospheric pressure within a short time;
enabling a calculation unit to calculate temporary displacement information according to the initial speed information, the acceleration information and a predetermined time interval;
enabling the calculation unit to calculate angle information according to the temporary displacement information and the modified height displacement information;
enabling the calculation unit to calculate modified acceleration information according to the acceleration information and the angle information;
enabling the calculation unit to calculate composite displacement information according to the initial speed information, the modified acceleration information and the predetermined time interval; and
enabling a processing unit to generate location information according to the composite displacement information and the modified height displacement information.

2. The locating method of claim 1, further comprising the following steps of:
enabling the calculation unit to calculate modified speed information according to the initial speed information, the modified acceleration information and the predetermined time interval; and
enabling the processing unit to update the initial speed information stored in the storage unit into the modified speed information.

3. The locating method of claim 1, wherein the step of calculating angle information further comprises the following step of:
enabling the calculation unit to calculate temporary displacement information according to the initial speed information, the acceleration information and the predetermined time interval;
wherein the angle information is calculated according to the temporary displacement information and the modified height displacement information.

4. The locating method of claim 1, wherein the step of generating location information further comprises the following step of:
enabling the calculation unit to calculate horizontal displacement information according to the composite displacement information and the angle information;
wherein the location information is generated according to the horizontal displacement information and the modified height displacement information.

5. The locating method of claim 4, further comprising the following steps of:
- enabling the storage unit to provide map information; and
- enabling the processing unit to label a horizontal location and an altitude location in the map information according to the location information.

6. A locating apparatus for a mobile device with an initial speed, the locating apparatus comprising:
- a storage unit being configured to store the initial speed as initial speed information;
- a sensing unit being configured to sense acceleration information and height displacement information, the height displacement information is sensed by an altimeter of the sensing unit, and the height displacement information is adjusted by an LPF of the sensing unit to reduce abrupt variations in atmospheric pressure within a short time;
- a calculation unit being configured to calculate temporary displacement information according to the initial speed information, the acceleration information and a predetermined time interval, to calculate angle information according to the temporary displacement information and the modified height displacement information, to calculate modified acceleration information according to the acceleration information and the angle information, and to calculate composite displacement information according to the initial speed information, the modified acceleration information and the predetermined time interval; and
- a processing unit being configured to generate location information according to the composite displacement information and the modified height displacement information.

7. The locating apparatus of claim 6, wherein the calculation unit is configured to calculate modified speed information according to the initial speed information, the modified acceleration information and the predetermined time interval, and the processing unit is configured to update the initial speed information stored in the storage unit into the modified speed information.

8. The locating apparatus of claim 6, wherein the calculation unit is configured to calculate temporary displacement information according to the initial speed information, the acceleration information and the predetermined time interval, and to calculate the angle information according to the temporary displacement information and the modified height displacement information.

9. The locating apparatus of claim 6, wherein the calculation unit is configured to calculate horizontal displacement information according to the composite displacement information and the angle information, and the processing unit is configured to generate the location information according to the horizontal displacement information and the modified height displacement information.

10. The locating apparatus of claim 9, wherein the storage unit is configured to store map information, and the processing unit is configured to label a horizontal location and an altitude location in the map information according to the location information.

11. A computer program storage product, comprising a non-transitory tangible machine-readable medium having executable codes stored therein to cause an apparatus to perform a locating method for a mobile device with an initial speed, the executable codes comprising:
- a code A for enabling a storage unit to store the initial speed as initial speed information;
- a code B for enabling a sensing unit to sense acceleration information and height displacement information, wherein the height displacement information is sensed by an altimeter of the sensing unit;
- a code B1 for enabling an LPF to adjust the height displacement information to reduce abrupt variations in atmospheric pressure within a short time;
- a code C0 for enabling a calculation unit to calculate temporary displacement information according to the initial speed information, the acceleration information and a predetermined time interval, to calculate;
- a code C for enabling the calculation unit to calculate angle information according to the temporary displacement information and the modified height displacement information;
- a code D for enabling the calculation unit to calculate modified acceleration information according to the acceleration information and the angle information;
- a code E for enabling the calculation unit to calculate composite displacement information according to the initial speed information, the modified acceleration information and the predetermined time interval; and
- a code F for enabling a processing unit to generate location information according to the composite displacement information and the modified height displacement information.

12. The computer program storage product of claim 11, the executable codes further comprising:
- a code G for enabling the calculation unit to calculate modified speed information according to the initial speed information, the modified acceleration information and the predetermined time interval; and
- a code H for enabling the processing unit to update the initial speed information stored in the storage unit into the modified speed information.

13. The computer program storage product of claim 11, wherein the code C further comprises:
- a code C1 for enabling the calculation unit to calculate temporary displacement information according to the initial speed information, the acceleration information and the predetermined time interval; and
- a code C2 for enabling the calculation unit to calculate the angle information according to the temporary displacement information and the modified height displacement information.

14. The computer program storage product of claim 11, wherein the code F further comprises:
- a code F1 for enabling the calculation unit to calculate horizontal displacement information according to the composite displacement information and the angle information; and
- a code F2 for enabling the processing unit to generate the location information according to the horizontal displacement information and the modified height displacement information.

15. The computer program storage product of claim 14, the program further comprising:
- a code I for enabling the storage unit to provide map information; and
- a code J for enabling the processing unit to label a horizontal location and an altitude location in the map information according to the location information.

* * * * *